United States Patent
Ono et al.

(10) Patent No.: US 8,967,003 B2
(45) Date of Patent: Mar. 3, 2015

(54) ENGINE STARTER

(75) Inventors: Hitoshi Ono, Kiryu (JP); Tomohiko Ikemori, Kiryu (JP); Shigeyuki Enkaku, Kiryu (JP); Chihiro Horikoshi, Kiryu (JP); Shinya Saito, Kiryu (JP); Shigehiro Kanbe, Maebashi (JP)

(73) Assignee: Mitsuba Corporation, Kiryu-shi (JP)

( * ) Notice: Subject to any disclaimer, the term of this patent is extended or adjusted under 35 U.S.C. 154(b) by 719 days.

(21) Appl. No.: 12/085,946

(22) PCT Filed: Dec. 26, 2006

(86) PCT No.: PCT/JP2006/325844
§ 371 (c)(1),
(2), (4) Date: Jun. 3, 2008

(87) PCT Pub. No.: WO2007/074802
PCT Pub. Date: Jul. 5, 2007

(65) Prior Publication Data
US 2009/0145263 A1 Jun. 11, 2009

(30) Foreign Application Priority Data
Dec. 28, 2005 (JP) .................................. 2005-377908

(51) Int. Cl.
*F02N 15/02* (2006.01)
*C23C 8/32* (2006.01)
*C23C 8/26* (2006.01)
*F16D 41/066* (2006.01)

(52) U.S. Cl.
CPC ... *C23C 8/32* (2013.01); *C23C 8/26* (2013.01); *F02N 15/023* (2013.01); *F16D 41/066* (2013.01); *F16D 2300/10* (2013.01)
USPC .............................. 74/7 C; 192/42; 123/179.1

(58) Field of Classification Search
USPC ................ 74/7 C; 192/42, 46; 123/179.1
See application file for complete search history.

(56) References Cited

U.S. PATENT DOCUMENTS

| | | | | |
|---|---|---|---|---|
| 3,022,204 A | * | 2/1962 | Muller et al. | 148/228 |
| 4,531,984 A | * | 7/1985 | Madsac et al. | 148/218 |
| 4,855,609 A | | 8/1989 | Eguchi et al. | |
| 4,986,140 A | * | 1/1991 | Morishita et al. | 74/7 C |
| 5,123,157 A | * | 6/1992 | Cerny | 29/607 |
| 5,520,273 A | | 5/1996 | Moribayashi | |
| 5,534,083 A | * | 7/1996 | Chung et al. | 148/218 |
| 6,237,432 B1 | * | 5/2001 | Vilou | 74/7 C |
| 6,315,455 B1 | * | 11/2001 | Tanaka et al. | 384/492 |
| 7,370,741 B2 | * | 5/2008 | Shimomura et al. | 192/42 |
| 7,870,801 B2 | * | 1/2011 | Nawa et al. | 74/7 C |
| 2005/0274215 A1 | | 12/2005 | Bishop et al. | 74/425 |
| 2006/0042081 A1 | * | 3/2006 | Takamura | 29/888.1 |
| 2010/0294078 A1 | * | 11/2010 | Ono et al. | 74/7 C |

FOREIGN PATENT DOCUMENTS

| | | |
|---|---|---|
| JP | Y2-59-026107 | 7/1984 |
| JP | A-63-230960 | 9/1988 |
| JP | U-05-042675 | 6/1993 |
| JP | A-08-093799 | 4/1996 |
| JP | A-2002-242935 | 8/2002 |
| JP | A-2005-030425 | 2/2005 |

\* cited by examiner

*Primary Examiner* — Justin Krause
*Assistant Examiner* — Gregory Prather
(74) *Attorney, Agent, or Firm* — Oliff PLC (57) ABSTRACT

An engine starter includes a motor that comprises a drive shaft; and a unidirectional rotation clutch system that is helical-splined to the drive shaft. The clutch system includes a clutch inner; a clutch outer; a clutch roller that is interposed between the clutch outer and the clutch inner; and a spring that urges the clutch roller, wherein a compound film is formed on a surface of the clutch roller or surfaces of the clutch outer and the clutch inner.

4 Claims, 6 Drawing Sheets

ENGINE STARTER

CROSS-REFERENCE TO RELATED APPLICATIONS

This application is the U.S. National Phase of PCT/JP2006/325844, filed Dec. 26, 2006, which claims priority from Japanese Patent Application No. 2005-377908, filed Dec. 28, 2005, the entire disclosure of which is incorporated herein by reference hereto.

BACKGROUND

The present disclosure relates to an engine starter.

There exists an engine starter that is constructed as shown in FIGS. 1, 2, 3A, and 3B. A motor (electric motor) M of the engine starter 1 uses a general-purpose brush-type DC motor. A base end of a motor shaft 2 is axially and rotatably supported on an end cover 3a that closes a base end side opening of a cylindrical yoke 3. A commutator 4 is integrally fitted onto a tip end of the motor shaft 2. To an outer periphery of the commutator 4, in a tip end side opening of the yoke 3, a ring-shaped holder stay 5 is mounted.

Figure 1:
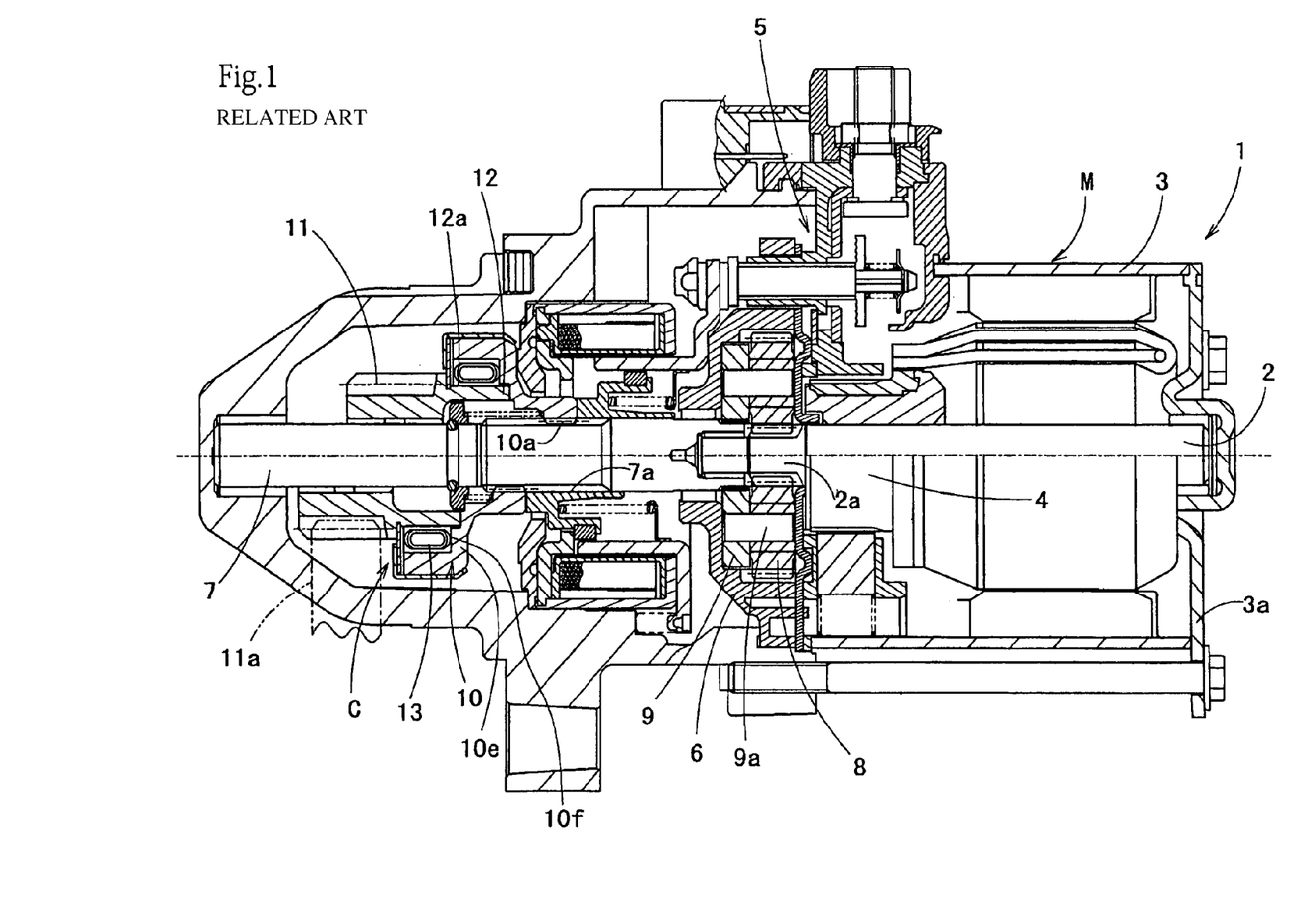
FIG. 1 is a partial sectional front view of an engine starter.

Reference numeral 6 denotes a bottomed cylindrical case (see FIG. 1). The case 6 forms a reduction gear D that is disposed to a tip end side of the motor M, that is, adjacent to the holder stay 5. In the case 6, a tip end 2a of the motor shaft 2 is installed. A base end of a drive shaft 7 is also disposed in the case 6 so as to rotatably fit onto the motor shaft tip end 2a. In the case 6, a plurality of planet gears 8 are also concentrically disposed with respect to the motor shaft tip end 2a so as to engage with the motor shaft tip end 2a and rotate circumferentially inside the case 6 according to the rotation of the motor shaft 2. A ring-shaped support plate 9 is also installed in the case 6 so as to be integrated with the planet gears 8 via a support shaft 9a. By fitting an inner peripheral surface of the support plate 9 integrally onto the drive shaft 7, a circumferential rotation of the planet gears 8 is interlocked with and joined to the drive shaft 7. A driving force of the motor M is thus transmitted to the drive shaft (pinion shaft) 7 in a reduced speed manner.

A unidirectional rotation clutch system C is disposed on a tip end of the drive shaft 7 (see FIG. 1). A clutch outer 10 of the clutch system C is formed of a stepped cylinder. The clutch outer 10 is fit onto the drive shaft 7 such that a helical spline 10a that is formed on an inner peripheral surface of a small-diameter cylinder is engaged with a helical spline 7a that is engraved in an outer peripheral surface of the tip end of the drive shaft 7. When relative rotation occurs between the drive shaft 7 and the clutch outer 10 in a predetermined rotating direction from a side of the drive shaft 7, the clutch outer 10 rotatively moves along the helical spline 7a of the drive shaft 7 and then moves to an active position on a tip end side (a position shown in a lower half of FIG. 1) from an inactive position (a position shown in an upper half of FIG. 1) on the base end side of the drive shaft 7. To an inside of a large-diameter cylinder on a tip end side of the clutch outer 10, a clutch inner 12 is joined that includes a pinion gear 11 that is formed on a tip end outer periphery and engages with a ring gear 11a on an engine side. The clutch inner 12 moves axially and integrally with the clutch outer 10.

Figure 2:
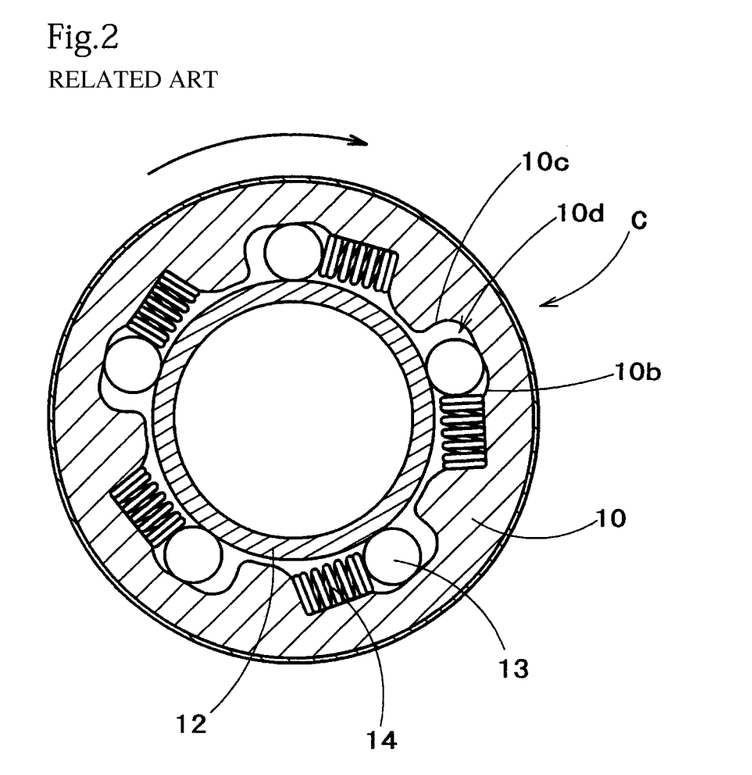
FIG. 2 is a sectional view of a clutch system.
Figure 3A:
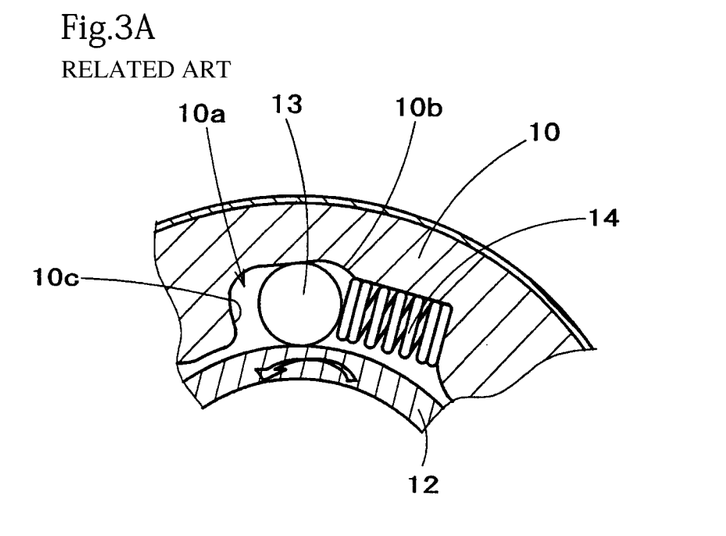
FIG. 3A is a main portion enlarged sectional view of the clutch system at a time of cranking.
Figure 3B:
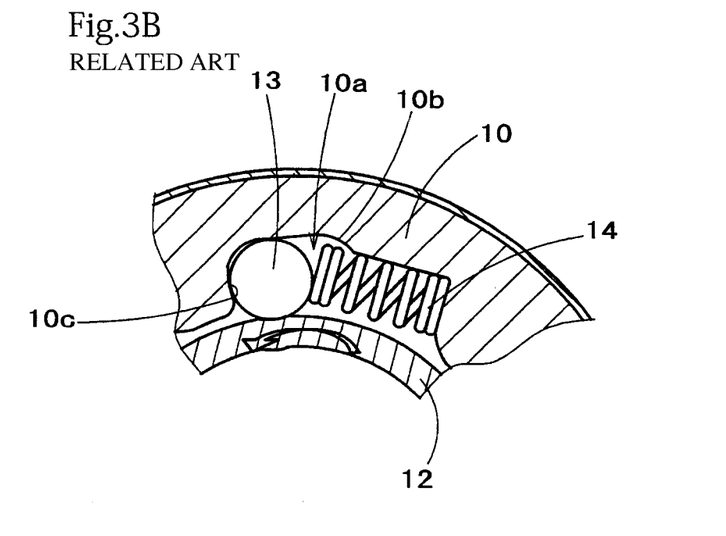
FIG. 3B is a main portion enlarged sectional view of the clutch system at a time of torque limiter actuation.

Reference numeral 13 denotes a clutch roller to be interposed between the clutch outer 10 and the clutch inner 12 (see FIGS. 1, 2, 3A, and 3B). Reference numeral 14 denotes a spring that urges the clutch roller 13 toward a side of a clutch outer wall. The clutch roller 13 is housed in a roller chamber 10d that is recessed in an inner peripheral surface of the clutch outer 10. In the roller chamber 10d, as shown in FIG. 2 and FIGS. 3A and 3B, an opposing distance is larger between the clutch inner 12 and the clutch outer 10 at a rotation side end 10b of a clockwise side so as to allow the clutch roller 13 to freely rotate. The opposing distance is narrower toward an engagement side end 10c of a counterclockwise side. When the motor M is halted, as shown in FIG. 2 and FIG. 3A, the clutch roller 13 is positioned at an intermediate position between ends 10b and 10c due to an urging force of the spring 14. In this state, because the clutch roller 13 does not engage with the clutch outer 10 and the clutch inner 12, a driving force is not transmitted. When the clutch outer 10 rotates clockwise, as shown by an arrow in FIG. 2, in response to driving of the motor M, then the clutch roller 13 moves to an engagement side end 10c, which is shown in FIG. 3B. An engaged state is thus set; and a rotating force of the clutch outer 10 is transmitted to the clutch inner 12 via the clutch roller 13. As a result, an engine starts.

When the engine starts, an overrun occurs such that rotation of the clutch inner 12 is faster than that of the clutch outer 10. As shown in FIG. 3A, the clutch inner 12 then rotates counterclockwise (an arrow direction) relatively to the clutch outer 10. The clutch roller 13 then moves toward the rotation side end 10b and freely rotates. This clutch unit thus functions as a one-way clutch unit that prevents the engine driving force from being transmitted to a side of the clutch outer 10 from the clutch inner 12 (see Japanese Published Examined Utility Model Application No. S59-26107 and Japanese Published Unexamined Utility Model Application No. H05-42675, for example).

SUMMARY

Figure 4A:
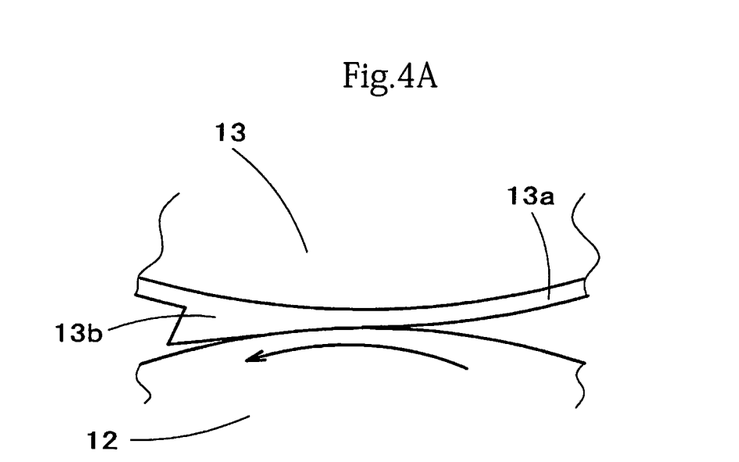
FIGS. 4A and 4B are explanatory views showing a mechanism of deformation of a clutch roller.
Figure 4B:
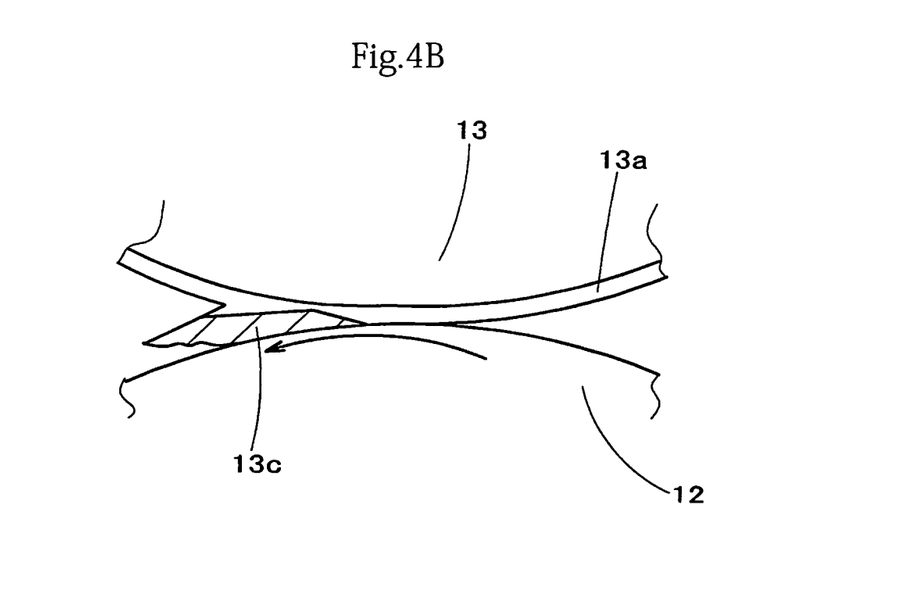

However, the ring gear 11a on a side of the engine may abnormally rotate while the engine starts because of some defective actuation, such as a defective ignition in the engine. A torque also may impact the drive shaft 7 from the pinion gear 11 because of the abnormal rotation of the ring gear 11a. In such a case, a load from the engine side that exceeds a normal torque load affects the clutch system C. The clutch roller 13 then reaches the engagement side end 10c as shown in FIG. 3B. If the torque impact is so large that the abnormal load exceeds a maximum normal force of the clutch roller 13, then the clutch roller 13 slips while engaging with the clutch inner 12. A high temperature state then occurs due to a frictional heat caused by the slipping. As a result, a softened portion 13a of the clutch roller 13 is generated, as shown in FIGS. 4A and 4B. Being subjected to shearing stress, such softened composition plastically flows. A drawn portion 13b is then formed (see FIG. 4A). If the drawn portion 13b exceeds a ductility limit of the material, then a breakage (exfoliation) 13c occurs. The clutch roller 13 then deforms (see FIG. 4B).

If the clutch roller 13 deforms, an engagement allowance (overlapping allowance) of the clutch roller 13 cannot be secured at the time when the engine starts. The clutch system C then idles, and as a result, the engine cannot smoothly start. The present disclosure solves the problems and is also able to achieve various advantages.

The disclosure addresses an exemplary aspect of an engine starter that includes a motor that comprises a drive shaft; and a unidirectional rotation clutch system that is helical-splined to the drive shaft. The clutch system includes a clutch inner; a clutch outer; a clutch roller that is interposed between the clutch outer and the clutch inner; and a spring that urges the clutch roller, wherein a compound film is formed on a surface of the clutch roller or surfaces of the clutch outer and the clutch inner.

In another exemplary aspect, the compound film is formed on the clutch roller.

In another exemplary aspect, the clutch roller is made of bearing steel, the compound film is formed by nitriding, and the nitriding is applied to the bearing steel that is quenched and tempered.

In another exemplary aspect, the nitriding is gas nitriding.

In another exemplary aspect, the nitriding is carbonitriding.

In another exemplary aspect, a clutch roller contacting surface of the clutch inner extends long in an axial direction of the clutch roller.

According to various exemplary aspects of the disclosure, because the compound film is formed on one of the sliding contact surfaces between the clutch roller, and the clutch outer and the clutch inner that come into sliding contact with the clutch roller, the sliding contacting surface can be stabilized as being a heterogeneous contact. Abrasion and fatigue resistance is thus excellent. Durability can also be improved against the excessive load from the engine side.

According to various exemplary aspects of the disclosure, because the compound film can be formed on the clutch roller, easy compound film formation can be achieved.

According to various exemplary aspects of the disclosure, because the compound film is formed by nitriding, durability can be improved.

According to various exemplary aspects of the disclosure, because gas nitriding or carbonitriding is applied with friction coefficient being lowered, the durability can be further improved.

According to various exemplary aspects of the disclosure, because the contacting surface of the clutch roller with the clutch inner is axially long, even if an end face of the clutch inner is chamfered or a bottom surface of the clutch outer is drafted, the clutch roller can come into contact with circumferential surfaces that are not chamfered or drafted. Local contacting with the clutch roller can thus be prevented. As a result, a uniform force can be applied, and the clutch life can also last longer.

BRIEF DESCRIPTION OF THE DRAWINGS

Various embodiments of the disclosure will be described with reference to the drawings, wherein.

DETAILED DESCRIPTION OF EMBODIMENTS

Focusing on the fact that the deformation of the clutch roller 13 has been caused by heating, a measure is formulated in order to prevent the deformation of the clutch roller by (1) reducing heating values; and (2) increasing strength against thermal softening.

First, a heating value is examined. The heating value Q is as follows:

$$Q=\mu PV$$

wherein $\mu$ represents a friction coefficient; P represents load; and V represents velocity. Reduction in contact surface pressure and friction coefficient are thus to be achieved. As being about the mechanical, however, the former is provisionally excluded from the present development theme. The reduction in friction resistance will thus be examined herein.

Figure 5A:
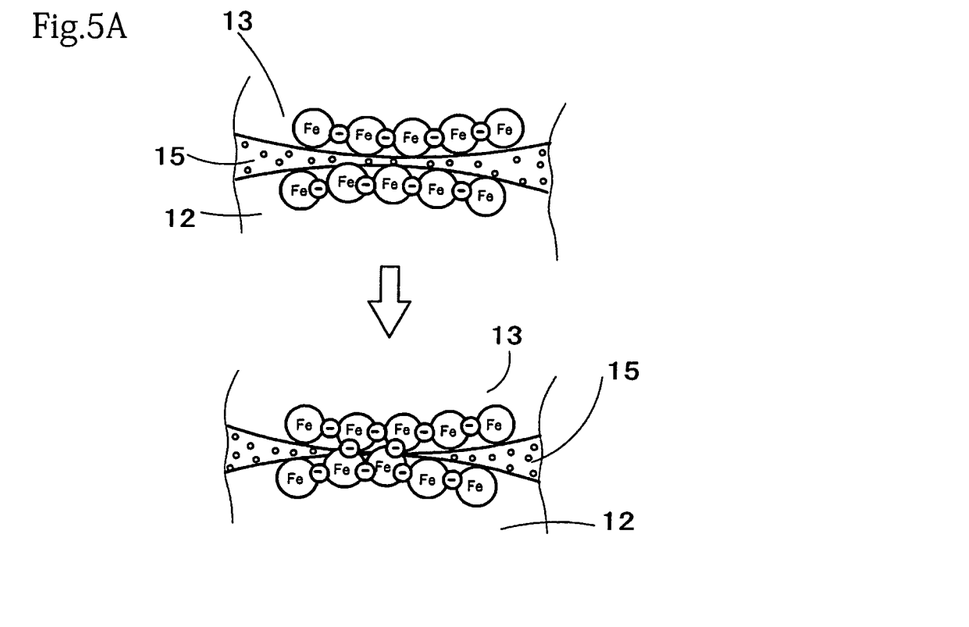
FIG. 5A is an explanatory view showing a mechanism of friction between irons.

Frictions between the clutch inner 12 and the clutch roller 13 are frictions of metals (irons). As a normal condition, grease (lubricant or clutch grease) is interposed at a space 15 between the clutch inner 12 and the clutch roller 13. However, when a load is imposed, the clutch inner 12 and the clutch roller 13 directly contact with each other and slide as shown in FIG. 5A. At sliding portions, electron migration then occurs. As a result, the portions adhere to each other between the clutch inner 12 and the clutch roller 13. A force that separates the portions is thus a frictional force. In other words, a measure for reducing such friction coefficient is to prevent the electron migration.

Figure 5B:
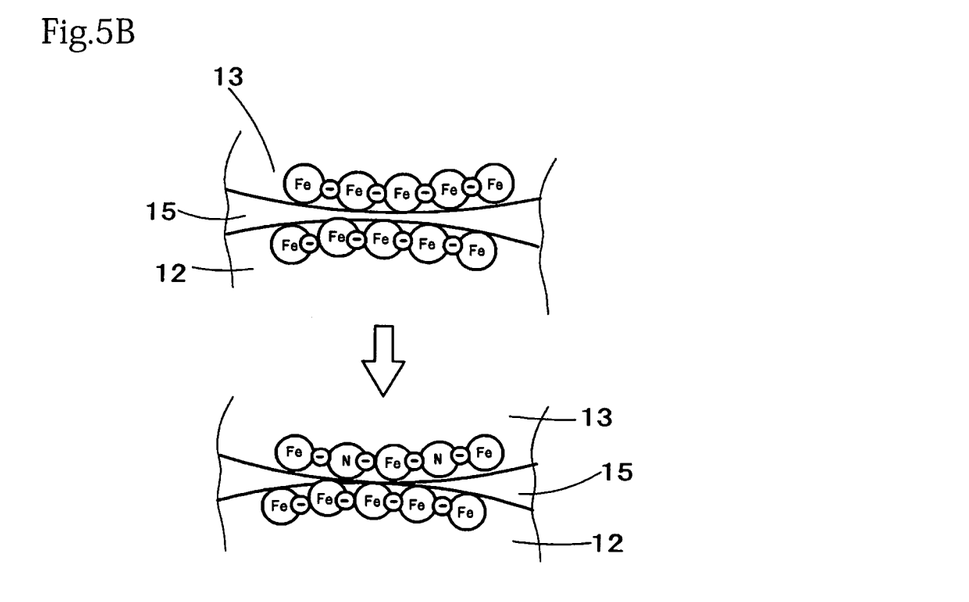
FIG. 5B is an explanatory view showing a mechanism of friction between irons and nitrided-irons.

An effective proposal includes a chemically stable substance being on the sliding and contacting surfaces. A stable compound film can thus be formed on one of the sliding surfaces of the clutch system C, in which the clutch roller 13 comes into sliding contact with both the clutch outer 10 and the clutch inner 12. By simply forming a compound film on the surface of the clutch roller 13, the sliding portions of both the clutch outer 10 and the clutch inner 12 can be reduced in friction resistance as shown in FIG. 5B. The compound film may instead be formed on both surfaces of the clutch outer 10 and the clutch inner 12, which ultimately reduces the friction resistance as coming into sliding contact with the clutch roller 13.

A circumferential surface 12a of the clutch inner 12 (see FIG. 1), with which the clutch roller 13 comes into contact, extends toward a side of the motor M in an axial direction. An extending end of the circumferential surface 12a is fit and incorporated in an attaching portion 10f that is recessed in a bottom surface 10e of the clutch outer 10. The clutch roller 13 comes into contact with the circumferential surface 12a of the clutch inner 12. Even if a clutch inner end face is chamfered or the clutch outer bottom surface 10e is drafted, the clutch roller 13 comes into contact with a circumferential surface that includes no chamfered or drafted portions. Local contacts with the clutch roller 13 do not occur, and a uniform force is also applied. As a result, a longer lifetime of the clutch can be achieved.

When such a compound film is formed, nitrogen can be used because of its firm bonding with iron. The compound film can thus be easily formed by nitriding. As such nitriding, gas nitriding or carbonitriding is preferable.

Reference numeral 13 denotes the clutch roller to be interposed between the clutch outer 10 and the clutch inner 12. Reference numeral 14 denotes the spring that urges the clutch roller 13 toward a side of the clutch outer wall. The clutch roller 13 is made of a bearing steel (for example, SUJ2), and its surface is nitrided by gas nitriding. The nitride is formed on the surface by a method via steps of adding 30 to 50 percent of ammonia ($NH_3$) gas into a carbonaceous gas or nitrogen gas atmosphere, heating and holding for 35 hours in an atmosphere with a temperature of 500 to 550 degrees Celsius, and penetrating and diffusing nitrogen. By this method, a nitride phase with 0.7 to 0.8 mm is formed on the surface of the clutch roller 13. As the nitride phase, two surface layers are formed: an A layer ($Fe_2N$) and a B layer ($Fe_4N$) with a thickness of approximately 14 micrometers. Inside the surface layers, a ($Fe+Fe_4N$) phase (hereinafter, referred to as "internal phase") is formed as a diffusion phase with a thickness of approximately 4 micrometers. Hardness of the surface is slightly lowered to Hv 670 from Hv 760 before being nitrided.

Figure 6A:
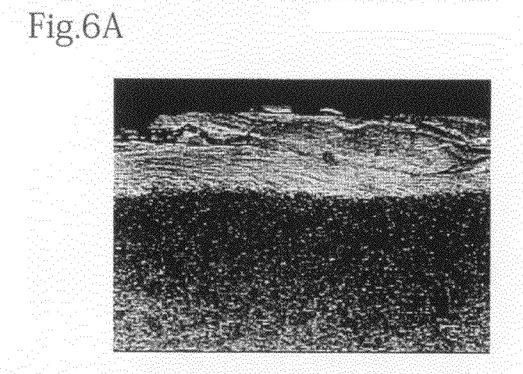
FIG. 6A is an enlarged photo after a clutch impact test is carried out for a blank.
Figure 6B:
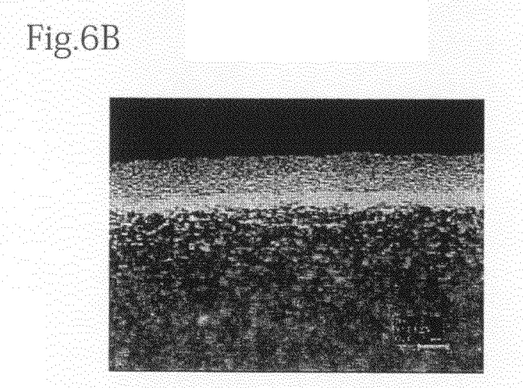
FIG. 6B is an enlarged, photo of a surface portion of the clutch roller before the clutch impact test is carried out for sample 2.
Figure 6C:
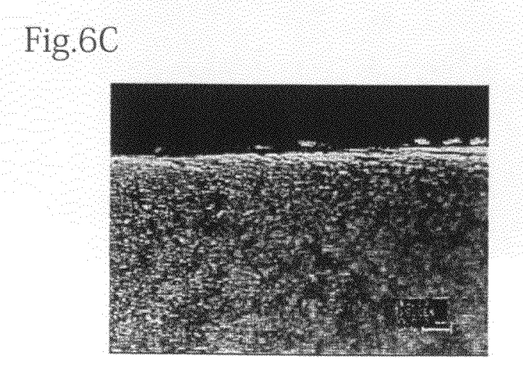
FIG. 6C is an enlarged photo of a surface portion of the clutch roller after the clutch impact test is carried out for sample 2.

Actual machine tests are repeated 20 times with the clutch roller 13 thus gas-nitrided. For the actual machine tests, two different samples of the clutch roller 13 are used: a clutch roller that is nitrided after being quenched (sample 1) and a clutch roller that is nitrided after being quenched and tempered (sample 2). In addition, as a blank, a clutch roller that is just quenched is also used for the tests. Test results are shown in the photos of FIGS. 6A-6C.

According to the test results, tissue changes under thermal influences can be observed in surface layers of the blank clutch roller. The surface layers are then plastically deformed and exfoliated. Several tens of micrometers of the exfoliation can also be observed. As for the samples 1 and 2, on the other hand, although external phases completely decay because of abrasions, the internal phases mostly last without being exfoliated. Thermal influences can also hardly be observed on those clutch rollers in themselves, which can continuously be used. In addition, the samples 1 and 2 being observed further, the internal phases remain thicker in the sample 2 than in the sample 1. The clutch roller 13 that is nitrided after being quenched and tempered is thus more excellent in durability.

Next, a clutch roller 13 whose surface is carbonitrided will be described. This method hardens a steel surface with nitrogen as well as carbon being penetrating into the steel surface. Carburizing is carried out for 50 to 150 minutes by adding 0.5 to 1.0 percent of ammonia ($NH_3$) in an atmosphere of carbonaceous gas, such as natural gas or LPG, and heating to 500 degrees Celsius or higher. A quenching temperature thereof can be lower than simple carbonizing because of the penetrating nitrogen. Quenching transformation is then reduced. The clutch roller 13 being examined further, friction coefficient of the steel that has been carbonitrided is lowered to 0.16, whereas friction coefficient of the steel that has not been carbonitrided is 0.21. In addition, surface hardness of the steel is increased to Hv 1000 from HV 760 before being carbonitrided.

Actual machine tests are repeated 20 times with the clutch roller 13 thus carbonitrided. For the actual machine tests, two different samples of the clutch roller 13 are being used: a clutch roller that is carbonitrided after being quenched (sample 3) and a clutch roller that is carbonitrided after being quenched and tempered (sample 4). In addition, as a blank, a clutch roller that is just quenched is also used for the tests.

According to test results, tissue changes under thermal influences can be seen in surface layers of the blank clutch roller. The surface layers are then plastically deformed and exfoliated. Several tens of micrometers of the exfoliation can also be seen. As for the samples 3 and 4, on the other hand, although surfaces of the treated layers completely decay because of abrasions, internal layers mostly last without being exfoliated. Thermal influences can also hardly be observed on those clutch rollers, which can continuously be used. In addition, the samples 3 and 4 being observed further, remaining carbonitrided layers of sample 4 are thicker than those of sample 3. The clutch roller 13 that is carbonitrided after being quenched and tempered is thus more excellent in durability.

The disclosure is not limited to the embodiment described above. The compound film can also be formed by using surface-treatment materials, such as chrome carbide (CrC) or titanium nitride (TiN). In addition, the compound film can be formed on the clutch inner and the clutch outer instead of the clutch roller.

The present disclosure relates to an engine starter that starts an engine (internal combustion) in a vehicle and especially can improve durability of a clutch roller. With the engine starter, further reliability can thus be achieved.

What is claimed is:

1. An engine starter, comprising:
   a motor that comprises a shaft of the motor;
   a reduction mechanism to engage with the shaft of the motor and transmit a driving force to a drive shaft;
   a unidirectional rotation clutch system that is helical-splined to the drive shaft, the clutch system being movable from an inactive position on a base end side of the drive shaft to an active position on a tip end side of the drive shaft when relative rotation occurs in a predetermined rotating direction from a side of the drive shaft;
   a pinion gear that connects with the clutch system, and engages with a ring gear on a side of an engine when the clutch system moves to an active position, wherein:
   the clutch system comprises:
      a clutch inner;
      a clutch outer;
      a clutch roller that is interposed between the clutch outer and the clutch inner; and
      a spring that urges the clutch roller,
   the clutch roller slips causing a frictional heat while engaging with the clutch inner when a torque impacts the drive shaft from the side of the engine,
   the clutch roller is made of bearing steel,
   a surface of the clutch roller is quenched and tempered before being gas nitrided so that a compound film is formed on the surface of the clutch roller such that the compound film includes a nitride phase with a surface layer formed as two surface layers (a layer ($Fe_2N$) and a layer ($Fe_4N$)) and an internal phase formed as a diffusion phase (a ($Fe+Fe_4N$) phase), wherein a thickness of the surface layer is 14/18 of a thickness of the compound film, a thickness of the internal phase is 4/18 of the thickness of the compound film, a surface of the clutch inner is not applied to be quenched, tempered and nitrided, and a surface of the clutch outer is not applied to be quenched, tempered and nitrided, and
   contact between the compound film formed surface of the clutch roller and the surface of the clutch outer and contact between the compound film formed surface of the clutch roller and the surface of the clutch inner is a sliding contact of heterogeneous surfaces so that a friction coefficient between the clutch roller and the clutch outer and a friction coefficient between the clutch roller and the clutch inner caused by the sliding contact is lowered as compared to when the compound film is not formed on the clutch roller.

2. The engine starter according to claim 1, wherein a clutch roller contacting surface of the clutch inner extends long in an axial direction of the clutch roller.

3. The engine starter according to claim 1, wherein the clutch system is structured as a one-way clutch unit such that a driving force of the engine is not transmitted to the motor after the engine starts through transmission of a driving force of the motor in response to driving of the motor.

4. The engine starter according to claim 1, wherein the clutch roller comes into contact with a circumferential surface that includes no chamfered or drafted portions.

\* \* \* \* \*